United States Patent [19]

Steidle

[11] Patent Number: 4,887,519

[45] Date of Patent: Dec. 19, 1989

[54] EXPANSION-CONTROLLED LIGHT ALLOY PISTON

[75] Inventor: Werner Steidle, Bad Friedrichshall, Fed. Rep. of Germany

[73] Assignee: Kolbenschmidt Aktiengesellschaft, Neckarsulm, Fed. Rep. of Germany

[21] Appl. No.: 841,632

[22] Filed: Mar. 19, 1986

[30] Foreign Application Priority Data

Mar. 29, 1985 [DE] Fed. Rep. of Germany ....... 3511557

[51] Int. Cl.⁴ .................................................. F16J 1/04

[52] U.S. Cl. ........................................ 92/228; 92/225; 123/193 P

[58] Field of Search ................. 92/225, 228, 222, 172, 92/229, 230; 123/193 P

[56] References Cited

U.S. PATENT DOCUMENTS

| | | | |
|---|---|---|---|
| 3,598,022 | 8/1968 | Maier | 92/228 |
| 3,908,521 | 9/1975 | Cockcroft | 92/228 |
| 4,074,617 | 2/1978 | Cockcroft | 92/228 |

FOREIGN PATENT DOCUMENTS

| | | | |
|---|---|---|---|
| 614830 | 6/1935 | Fed. Rep. of Germany | 123/193 P |
| 2441933 | 11/1976 | Fed. Rep. of Germany | 123/193 P |
| 3446121 | 8/1985 | Fed. Rep. of Germany | 92/212 |
| 3427176 | 1/1986 | Fed. Rep. of Germany | 123/193 P |
| 3526212 | 1/1987 | Fed. Rep. of Germany | 123/193 P |
| WO8301278 | 4/1983 | PCT Int'l Appl. | 123/193 P |
| 1598680 | 9/1981 | United Kingdom | 123/193 P |

*Primary Examiner*—Robert E. Garrett
*Assistant Examiner*—Thomas Denion
*Attorney, Agent, or Firm*—Sprung Horn Kramer & Woods

[57] ABSTRACT

In expansion-controlled light alloy pistons for internal combustion engines, expansion control elements made of steel are bonded to the carrying portions of the cast skirt on the inside peripheral surface thereof and are embedded in the hubs of the piston pin bosses. To provide for an optimum expansion control action throughout the height of the piston skirt, the expansion control elements are provided on both sides of the plane of oscillation of the connecting rod with an aperture, which is open toward the end of the skirt and has a height amounting to at least 30% of the height of the expansion control elements. Said aperture has a peripheral dimension amounting to more than 10% of the piston diameter. Projections for supporting the expansion control element at its edges defining the aperture protrude into the latter.

7 Claims, 2 Drawing Sheets

Fig.1
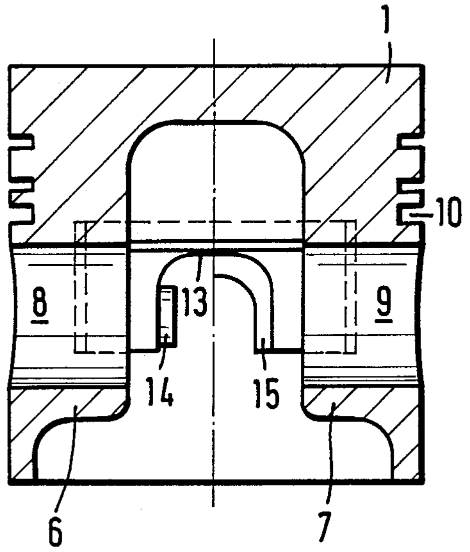
Fig.2
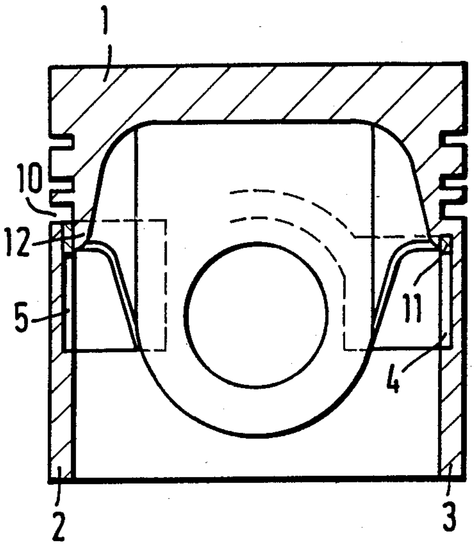
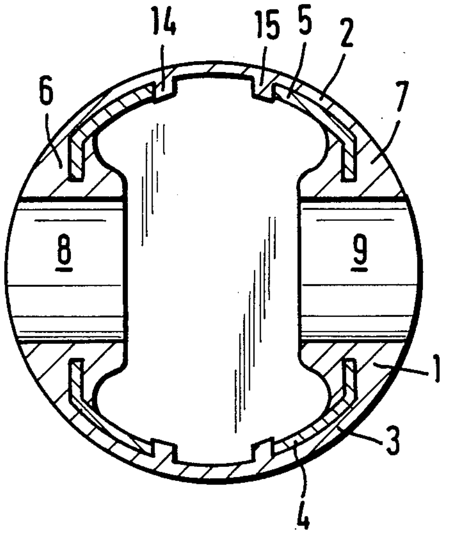
Fig.3

EXPANSION-CONTROLLED LIGHT ALLOY PISTON

BACKGROUND OF THE INVENTION

This alloy relates to an expansion-controlled light alloy piston for internal combustion engines, particularly for diesel engines, comprising at least one plate-like or strip-like expansion control element, which preferably consists of steel and is bonded to the inside peripheral surface of the carrying portions of the skirt of the piston and is embedded in the cast hubs of the piston pin eyes, and which on that portion which is adjacent to the piston head is covered on the inside by an embedding inner bead, which extends between the hubs of the piston pin eyes to a level which is spaced above the lower end of the expansion control element by 10 to 50% of the height of said element.

Such an expansion-controlled light alloy piston is known in its basic form as a segment strip piston and has been described in German Patent Application No. 10 78 387. The expansion control action of such control elements is due to the fact that the light alloy layer which lies on the outside peripheral surface of such control elements shrinks onto the expansion control element a said layer cools after the piston has been cast and said shrinkage gives rise to tensile stresses in the light alloy casting and to compressive stresses in the expansion control element. In those embodiments in which the top edge of the expansion control element extends into the oil ring groove, that element will be exposed as the oil ring groove is machined so that the initial stress equilibrium between the expansion control element and the embedding light alloy casting is disturbed and the expansion control element snaps outwardly and increases the inherent tensile stresses in the embedding light alloy-casting. This improves the expansion control action. A gap of about 50 μm is formed between the expansion control element and the embedding cast inner bead extending between the hubs of the piston pin eyes. When the temperature of such piston rises during the operation of the engine, the stresses will decrease in dependence on the temperature rise so that the elastic deformation of the embedding light alloy casting decreases. That action is superposed on the natural tendency of the part concerned to expand when heated so that the parts will exhibit a radial thermal expansion as though they consisted of a single material having a coefficient of expansion between the respective coefficients of expansion of the piston material and the material of the expansion control element. Such pistons exhibit a good expansion control action particularly adjacent to the expansion control element but have only a slight expansion control action on the lower skirt portion of the piston.

In other pistons, known from German Patent Specifications No. 17 50 426 and 12 71 271, the expansion control action is improved in that strip-like or segment-like expansion control elements provided in the upper skirt portion are combined with expansion control elements consisting of sleeve segments and disposed in the lower skirt portion. The expansion control action of such pistons is due to two basically different principles. In the upper skirt portion the expansion control is mainly the result of the above-described shrinkage, as described hereinbefore, whereas in the lower skirt portion the expansion control is mainly due to a bimetal effect. The expansion-controlling sleeve segments disposed in the middle and lower skirt portions and the light alloy layer lying on their outside peripheral surface constitute bimetallic expansion control elements, which is the case of a temperature rise tend to change their curvature. As a result, the skirt is deformed to an oval shape in such a manner that the largest radial expansion of heat takes place in the axial direction of the piston pin and the dimension in the plane of oscillation of the connecting rod is correspondingly reduced. That design, which is adopted to provide for an expansion control action throughout the piston skirt, involves mainly the disadvantage that the expansion control elements have a large area so that the piston weight does not meet the requirements for pistons in internal combustion engines. Besides, expansion control elements having a large area are undesirable from the aspect of casting technology.

In order to meet the more stringent requirements regarding reduction of noise and reduction of friction losses, the piston should be light in weight, have a small assembling clearance, an axial contour having only a minimum curvature and the smallest possible thermal expansion in excess of that of the inside surface of the cylinder liner. To ensure a maximum life with unchanged riding comfort, the piston must be stiff particularly at its skirt end so that the skirt will not be deformed to a substantial extent.

A higher stiffness of the lower skirt portion has an undesirable influence particularly on the expansion control action of pistons which exert an expansion control that is due to shrinkage. In such pistons there will be only a small expansion control action or no expansion control action at all in the lower skirt portion, particularly if there is a large distance between the measuring point at the lower skirt portion and the lower edge of the expansion control plate. Pistons in which an expansion control action is exerted as a result of shrinkage and by bimetal action do not meet the requirements for a light weight.

SUMMARY OF THE INVENTION

It is the object of the present invention to provide an expansion control element for effecting an expansion control resulting from shrinkage and from bimetal action.

That object is accomplished in that each expansion control element has on both sides of the plane of oscillation of the connecting rod an aperture which is open toward the lower end of the skirt and extends over a peripheral length of more than 10% of the piston diameter and has an axial height of at least 30% of the height of the expansion control element and terminates at or short of the beginning of the embedding inner bead, and projections are provided, which consist of the piston material and extend over at least part of the width of said aperture and protrude into the latter and serve to support those edges of the expansion control element which define the aperture.

The original concept of expansion control by shrinkage has been modified over the height of the aperture to provide an expansion control by bimetal action. But the expansion control effected by the bimetal action is not restricted to the height of the expansion control element but is effected throughout the skirt, mainly in its middle and end portions. In a comparison with the segment strip pistons described first hereinbefore, that design results for a piston having a given weight, in the same effective expansion control action as in the upper portion of the skirt of a segment strip piston and results in a much more effective expansion control in the lower skirt portion. The embedded portion of the expansion control element has a larger axial height toward the piston pin hub and is formed in the middle portion of the skirt with an aperture extending at right angles to the axis of the piston pin. The expansion behavior of the skirt can be controlled by the selection of the width and height of the aperture of the expansion control element.

In accordance with a further development of the invention, the aperture extends in the peripheral direction of the piston over up to 60% and preferably over 25 to 35% of the piston diameter, and has an axial height amounting to 30 to 85%, preferably 65 to 75% of the height of the expansion control element.

In accordance with a further development of the invention, the or each expansion control element extends at its top edge into the oil ring groove and the piston has been machined to expose the or each expansion control element at least over part of its periphery so that the piston head remains metallically separated from the skirt of the piston between the piston pin bosses. In that embodiment a gap of about 50 $\mu m$ is provided between the embedding inner bead and the expansion control element.

In expansion-controlled pistons for very high loads, the or each expansion control element should terminate about 3 millimeters short of the lower side face of the oil ring groove and should not be exposed, although the expansion control at the top edge of the skirt will be less effective in that case.

In expansion-controlled pistons for relatively light loads, that skirt half which is subjected to stronger lateral forces is provided with an expansion control element and the skirt half which is subjected to lighter lateral forces is separated from the piston head by a transverse slot.

In pistons for relatively heavy loads, the expansion control element may be provided only on that skirt half which is subjected to lighter loads and may be exposed in the oil ring groove. In that case the skirt half subjected to heavier loads is similar to one half of a smooth skirt.

A full bimetal action will be obtained even when the projections supporting the edges of the aperture in the expansion control element extend only over 30% of the peripheral dimension of the aperture.

It has been found that it is particularly desirable to define the aperture by rounded edges in order to increase the strength which is due to shape.

The invention is shown by way of example in the drawings and will now be explained more in detail.

BRIEF DESCRIPTION OF THE DRAWINGS

FIG. 1 is a longitudinal sectional view showing an expansion-controlled light alloy piston, the longitudinal sectional view being in the plane which is defined by the axes of the piston and of the piston pin.

FIG. 2 shows a piston in a longitudinal sectional view in a plane which is at right angles to the plane defined by the axes of the piston and of the piston pin.

FIG. 3 shows a piston in a transverse sectional view taken on the horizontal plane which extends through the axis of the piston pin.

DETAILED DESCRIPTION OF THE INVENTION

Figure 4:
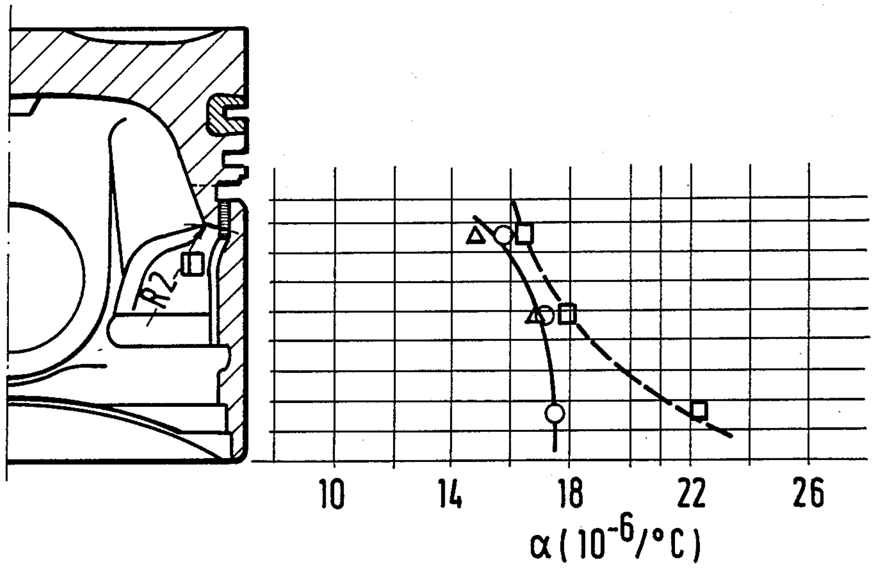
FIG. 4 shows an expansion-controlled light alloy piston partly in a longitudinal sectional view on the plane which is defined by the axes of the piston and of the piston pin, with the thermal expansion of the piston skirt being graphically illustrated.

Referring now to FIGS. 1–3, the expansion-controlled piston 1 is a casting made of a conventional piston aluminum alloy.

Segment-shaped expansion control elements of steel are bonded to the carrying shaft portions 2, 3 on the inside peripheral surface of the latter and are embedded in the hubs 6, 7 of the piston pin bosses 8, 9. The expansion control elements 4, 5 extend as far as into the oil ring groove 10 and are machined and exposed in said groove. In an alternative embodiment, shown on the right-hand half of FIG. 2, the expansion control elements 4 terminate short of the lower side face of the oil ring groove so that in that case, that portion of each expansion control element which is adjacent to the piston head is covered by the piston material on all sides. On the upper portion of each expansion control element 4 or 5, an embedding inner bead 12 extends between the hubs 6, 7 on the inside surface of the skirt as an extension of the piston head to a point which is spaced from the lower end of the expansion control element 4 or 5 by about 20% of the height of that element. Each expansion control element 4 or 5 is formed on both sides of the plane of oscillation of the connecting rod with an aperture 13 that is open toward the lower end of the skirt. The apertures 13 extend upwardly almost to the beginning of the embedding inner bead 12. Projections 14, 15 consisting of the piston material extend into the apertures 13 and support the adjoining edges of the expansion control elements.

The thermal expansion of the skirt of the expansion-controlled light alloy piston in accordance with the invention is represented in FIG. 4 by a solid curve. Beside that curve, the thermal expansion of the segment strip piston of the prior art is represented by a dotted line. A comparison of said two curves shows that with the expansion control element in accordance with the invention the piston skirt has particularly in its lower portion a much smaller expansion than the skirt of the segment strip piston.

It will be appreciated that the instant specification and claims are set forth by way of illustration and not limitation, and that various modifications and changes may be made without departing from the spirit and scope of the present invention.

What is claimed is:

1. An expansion-controlled light alloy piston for internal combustion engines, particularly for diesel engines, comprising at least one plate-like or strip-like expansion control element with peripheral parallel pins, which comprises steel and is bonded with its outside, lower side and upper side to an inside peripheral surface of carrying portions of a skirt of the piston and is embedded with coaxial edges in cast hubs of piston pin eyes, and which on that portion which is adjacent to the piston heat is covered on the inside by an embedding inner bead, which extends between the hubs of the piston pin eyes to a level which is spaced above the lower end of the expansion control element by 10 to 50% of the height of said element, wherein the expansion control element has on both sides of the plane of oscillation of the connecting rod, an aperture which is open toward the lower end of the skirt and extends over a peripheral length of more than 10% and up to 60% of the piston diameter and has an axial height amounting to 30 to 85% of the height of the expansion control element and terminates at or short of the beginning of the embedding inner bead and further comprising projections which comprise the piston material and extend over at least part of the width of said aperture and protrude into the latter and serve to support those edges of the expansion control element which define the aperture.

2. An expansion-controlled light alloy piston according to claim 1, wherein each expansion control element extends at its upper edge as far as into an oil ring groove and is exposed in the oil ring groove at least on a part of the periphery.

3. An expansion-controlled light alloy piston according to claim 1, wherein the top edge of each expansion control element terminates about 3 mm under the lower side face of an oil ring groove.

4. An expansion-controlled light alloy piston according to claim 1, wherein the expansion control element is provided only on that half of the skirt which is subjected to lighter lateral forces and is exposed in an oil ring groove.

5. An expansion-controlled light alloy piston according to claim 1, wherein the expansion control element is provided on that half of the skirt which is more highly loaded by side forces and that half of the skirt which is subjected to a lighter load by the lateral forces is separated from the piston head by a transverse slot.

6. An expansion-controlled light alloy piston according to claim 1, wherein each aperture is defined by rounded edges.

7. An expansion-controlled light alloy piston according to claim 1, wherein each aperture extends in the peripheral direction of the piston over 25 to 35% of the piston diameter and the aperture has an axial height amounting to 65 to 75% of the height of the expansion control element.

* * * * *